(12) United States Patent
Wen et al.

(10) Patent No.: US 7,234,340 B2
(45) Date of Patent: Jun. 26, 2007

(54) APPARATUS, METHOD, AND MEDIUM FOR DETECTING AND DISCRIMINATING IMPACT SOUND

(75) Inventors: Xue Wen, London (GB); Yongbeom Lee, Suwon-si (KR); Jaewon Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 60 days.

(21) Appl. No.: 11/050,806

(22) Filed: Feb. 7, 2005

(65) Prior Publication Data

US 2005/0199064 A1 Sep. 15, 2005

(30) Foreign Application Priority Data

Feb. 10, 2004 (KR) .................. 10-2004-0008738

(51) Int. Cl.
*G01M 13/00* (2006.01)
(52) U.S. Cl. .................................................. 73/11.04
(58) Field of Classification Search ............... 73/11.01, 73/12.01, 11.04
See application file for complete search history.

(56) References Cited

U.S. PATENT DOCUMENTS

| | | | | |
|---|---|---|---|---|
| 4,845,464 | A | * | 7/1989 | Drori et al. .................. 340/429 |
| 4,935,748 | A | * | 6/1990 | Schmidt et al. ............ 346/33 C |
| 5,046,362 | A | * | 9/1991 | Strubbe ........................ 73/579 |
| 5,425,436 | A | * | 6/1995 | Teramura et al. ........... 188/280 |
| 5,438,317 | A | * | 8/1995 | McMaster ................... 340/550 |
| 5,552,770 | A | * | 9/1996 | McMaster ................... 340/550 |
| 5,737,481 | A | * | 4/1998 | Gushima et al. ........... 386/113 |

FOREIGN PATENT DOCUMENTS

| | | |
|---|---|---|
| JP | 10-206225 | 8/1998 |
| JP | 10-260075 | 9/1998 |
| JP | 2003-083802 | 3/2003 |

OTHER PUBLICATIONS

Korean Office Action; mailed Dec. 15, 2005, Application No. 10-2004-0008738.

* cited by examiner

*Primary Examiner*—Max Noori
(74) *Attorney, Agent, or Firm*—Staas & Halsey LLP

(57) ABSTRACT

An apparatus, method, and medium for detecting an impact sound and an apparatus, method, and medium for discriminating the impact sound using the same. The impact sound detecting apparatus includes: an onset detector separating an input signal of a frame unit into a low frequency signal and a high frequency signal, measuring powers of the separated signals, and detecting onsets by detecting changes in the measured powers; an event buffer buffering the powers measured by the onset detector and spectral data of the input signal; and an impact sound verifier determining whether each of the detected onsets is an impulse onset, and if each of the detected onsets is the impulse onset, detecting events starting from the impulse onsets by checking the powers stored in the event buffer and determining each of the detected events to be an impulse event if each of the detected onsets satisfies a predetermined condition.

45 Claims, 9 Drawing Sheets

APPARATUS, METHOD, AND MEDIUM FOR DETECTING AND DISCRIMINATING IMPACT SOUND

CROSS-REFERENCE TO RELATED APPLICATIONS

This application claims the benefit of Korean Patent Application No. 2004-8738, filed on Feb. 10, 2004, in the Korean Intellectual Property Office, the disclosure of which is incorporated herein in its entirety by reference.

BACKGROUND OF THE INVENTION

1. Field of the Invention

Embodiments of the present invention relate to an apparatus, method, and medium for detecting an impact sound and an apparatus, method, and medium for discriminating the impact sound using the same, and more particularly, to an apparatus, method, and medium for detecting an impact sound among various sounds generated from the surrounding environments and an impact sound discriminating apparatus, method, and medium for discriminating whether the detected impact sound is a target impact sound.

2. Description of the Related Art

An impact sound or an impulsive acoustical event generated by a mechanical interaction between objects has a short duration and relatively high intensity. This characteristic of the impact sound is called impulsiveness. According to signal processing theories, the impulsiveness can be modeled as a zero-state impulse response of a linear system.

The impact sound, for example, includes a simplex sound, such as a sound generated when a pane of glass is hit by a solid stick, and a complex sound such as an explosion sound and a sound generated when a coin drops a floor.

The impact sound is discriminated by detecting and discriminating the existence and characteristics of an impulsive acoustical event from a consecutive sound stream.

SUMMARY OF THE INVENTION

Embodiments of the present invention provide an impact sound detecting apparatus, method, and medium for sensing an onset signal and detecting an impact sound.

Embodiments of the present invention also provide an impact sound discriminating apparatus, method, and medium for discriminating whether a detected impact sound is a target impact sound by verifying the detected impact sound using impact sound sources.

Additional aspects and/or advantages of the invention will be set forth in part in the description which follows and, in part, will be obvious from the description, or may be learned by practice of the invention.

To achieve the above and/or other aspects and advantages, embodiments of the present invention set forth an impact sound detecting apparatus, including an onset detector separating an input signal of a frame unit into a low frequency signal and a high frequency signal, measuring powers of the separated low frequency and high frequency signals, and detecting an onset by detecting changes in the measured powers, an event buffer buffering the measured powers and corresponding spectral data of the input signal, and an impact sound verifier determining whether each detected onset is an impulse onset, and if each detected onset is the impulse onset then detecting events starting from the corresponding impulse onsets by checking the corresponding measured powers stored in the event buffer and identifying each of the detected events to be an impulse event if each of the detected onsets satisfies a predetermined condition.

The onset detector may include an AC/DC separator separating an AC component from the input signal, as the high frequency signal, and a DC component from the input signal, as the low frequency signal, a high frequency onset detector obtaining a phase characteristic and an amount of power change of the AC component in a frequency domain, calculating amounts of power change of the AC component in a time domain, detecting onsets of the AC component using the phase characteristic and the amounts of power change of the AC component, and outputting a trigger value, a low frequency onset detector subdividing the DC component into frequency bands, obtaining amounts of power change for each frequency band, detecting onsets of the DC component by comparing the amounts of power change of each frequency band with a first threshold and combining the amounts of power change of each frequency band, and outputting an onset determining value, and an onset determiner identifying whether onsets occur in the input signal using respective amounts of power change for the AC component and each frequency band, the trigger value, and the onset determining value.

The AC/DC separator may include a low pass filter passing the low frequency signal of the input signal, and a subtractor outputting the high frequency signal by subtracting the low frequency signal from the input signal.

The high frequency onset detector may include a frequency domain onset detector obtaining a phase linearity in the frequency domain and a power change ratio by performing fast-Fourier transform on the AC component, a time domain onset detector obtaining powers of the AC component in the time domain and obtaining the amounts of power change of the AC component by respective spectral data of the input signal, a combiner combining an output of the frequency domain onset detector and an output of the time domain onset detector, and an onset trigger unit identifying an output of the combiner to be the onsets of the AC component according to the amounts of power change of the AC component from the time domain onset detector and outputting the corresponding trigger value.

Further, the frequency domain onset detector may include a fast Fourier transformer (FFT) performing the fast-Fourier transform on the AC component, a linear phase span unit approximating phases of corresponding fast-Fourier-transformed spectral data to a linear function and obtaining a difference between a phase of the approximated first spectral data and a phase of spectral data located at a center of the frame unit, and a banked power increasing ratio calculator obtaining powers of the fast-Fourier-transformed spectral data, comparing powers of a first half of the frame unit with a second half of the frame unit, and obtaining a ratio of the compared powers greater than a second threshold.

The time domain onset detector may include a power calculator obtaining a power of the AC component and scaling the obtained power logarithmically, a delta calculator calculating a difference between log-powers of current spectral data and previous spectral data output from the power calculator, and an onset filter obtaining an average of log-powers in a current frame unit and outputting a difference between the log-power average of the current frame and a log-power average of a previous frame.

Further, the onset filter is a second order filter formed by combining two first order filters and has an impulse response as follows:

$$h(n) = (1-e^{1/\tau_e})e^{n/\tau_e} - (1-e^{1/\tau_i})e^{n/\tau_i}, \; n=1,2,3,\ldots$$

where $\tau_e$ and $\tau_i$ are time constants of the two first order filters.

The combiner may further include a first weighting unit matched-filtering an output of the linear phase span unit, a second weighting unit shift-multiplying outputs of the banked power increasing ratio calculator and the delta calculator, and a third weighting unit performing an identity operation of an output of the onset filter, wherein the combiner adds outputs of the first, second, and third weighting units and outputs a result of the addition.

In addition, the onset trigger unit may output a positive or negative value based on an output of the combiner, using an output of the onset filter as a control signal.

Similarly, the low frequency onset detector may include a filter bank unit subdividing the DC component into frequency bands, a power calculator calculating a power for each frequency band and scaling the calculated powers logarithmically, a delta calculator calculating differences of log-powers output from the power calculator between neighboring frequency bands, a comparator determining whether a local onset occurs by comparing each delta log-power output from the delta calculator for each frequency band with the first threshold, and a combiner combining the detected local onsets, detected by the comparator, to output the onset determining value.

The onset determiner may output a binary signal indicating whether an onset occurs by adding the trigger value and the onset determining value if the trigger value is output and a ratio of powers measured by the high frequency onset detector to a total power of the input signal is greater than the second threshold.

In addition, the onset determiner may output a binary signal indicating whether an onset occurs by adding the trigger value and the onset determining value if the onset determining value is output and a ratio of powers measured by the low frequency onset detector to a total power of the input signal is greater than the second threshold.

The onset detector may further include a noise level detector detecting a noise level of the input signal, where the onset detector detects onsets from a signal obtained by subtracting the detected noise level from the input signal.

Further, the impact sound verifier may include an impulse onset selector determining whether each of the detected onsets is an impulse onset by checking the corresponding measured powers stored in the event buffer if the detected onsets are detected by the onset detector, an event former searching each event duration started from the impulse onsets using the measured powers stored in the event buffer, and an impulse event selector identifying each event searched by the event former to be an impulse event if corresponding events satisfy characteristics for the impulse event.

The impulse onset selector, if the onsets are detected, may determine whether power peaks occur by monitoring the measured powers stored in the event buffer and determine whether the detected onsets are impulse onsets by comparing amounts of power increases from a start time of each of the detected onsets to each of power peak times with a predetermined threshold.

The event former may also form each of the events by defining a start time of an event duration as an occurrence time of each of the power peaks and an ending time of the event duration as a time when power falls below a predetermined level or when the impulse onset selector outputs a succeeding impulse onset. The impulse event selector may also search a power function approximating the events formed by the event former and determine whether each of the events is an impulse event by determining whether the power function attenuates exponentially within a predetermined range from each of the power peaks.

To achieve the above and/or other aspects and advantages, embodiments of the present invention set forth an impact sound detecting method including separating an input signal of a frame unit into an AC component, from the input signal, a high frequency signal and a DC component, from the input signal, as a low frequency signal, measuring powers of the separated high and low frequency signals and detecting onsets by checking changes of the measured powers, buffering the measured powers and the input signal and determining whether each of the detected onsets is an impulse onset, detecting events starting from onsets determined to be impulse onsets by checking the buffered powers for each of the detected onsets determined to be impulse onsets, and identifying each of the detected events to be an impulse event if the detected events satisfy a predetermined condition.

The detecting of the onset may include obtaining a phase characteristic and an amount of power change of the AC component in a frequency domain, calculating an amount of power change of the AC component in a time domain, detecting onsets of the AC component by combining the phase characteristic and the amounts of power change for the AC component in the frequency and time domains, to output a trigger value, subdividing the DC component into frequency bands and obtaining amounts of power change for each frequency band, detecting onsets of the DC component by comparing the amounts of power change of the DC component for each frequency band with a first threshold and combining the amounts of power change for each frequency band, and detecting the onsets of the input signal based on a combining the detected onsets of the AC and DC components, the trigger value and the onset determining value.

In addition, the phase characteristic may be obtained by performing fast-Fourier transform on the AC component, approximating phases of the fast-Fourier-transformed AC component spectral data to a linear function, and obtaining a difference between a phase of an approximated first spectral data and a phase of spectral data located at a center of the frame unit.

Similar to above, the amount of power change of the AC component in a frequency domain can be obtained by performing fast-Fourier transform on the AC component, and obtaining a ratio of power increase greater than a second threshold by comparing powers of a first half of the frame unit of the fast-Fourier-transformed AC component spectral data with a second half of the frame unit.

Further, the amounts of power change of the AC component in a time domain can be obtained by obtaining a power of the AC component and scaling the obtained power logarithmically, calculating a difference between log-powers of current spectral data and previous spectral data, and obtaining an average of the log-powers in a current frame unit and outputting a difference between log-power averages of the current frame unit and a previous frame unit.

The combining of the phase characteristic and the amounts of power change may include matched-filtering the phase characteristic, shift-multiplying the amounts of power change in the frequency domain and the time domain, and performing identity operation on a difference between log-power averages of a current frame unit and a previous frame unit, wherein the matched-filtering result, the shift-multiplying result, and the identity operation result are added.

In addition, the detecting of the onsets of the input signal may include outputting a binary signal, indicating whether an onset occurs, obtained by adding the trigger value and the onset determining value if the trigger value is output and a ratio of a measured power the AC component to a total power of the input signal is greater than a second threshold.

The identifying of each of the detected events to be the impulse event may include determining whether power peaks occur by monitoring the buffered powers and determining whether each of the onsets is the impulse onset by comparing a power value increased from a start time of each of the onsets to a power peak time with a predetermined threshold.

In addition, the detecting of events may include forming events by defining a start time of each event duration as the power peak time and an ending time of each event duration as a time when power falls below a predetermined level or when a succeeding impulse onset occurs.

The identifying of the detected events to be the impulse event may also include searching a power function approximating events formed in the detecting of events and determining whether each of the detected events is the impulse event by determining whether the power function attenuates exponentially within a predetermined range from each power peak.

To achieve the above and/or other aspects and advantages, embodiments of the present invention set forth an impact sound discriminating apparatus including an onset detector separating an input signal of a frame unit into a low frequency signal and a high frequency signal, measuring powers of the separated low and high frequency signals, and detecting onsets by checking changes of the measured powers, an event buffer buffering the measured powers and the input signal, an impact sound verifier determining whether each of the detected onsets is an impulse onset, and if a detected onset is the impulse onset, detecting events starting from impulse onsets by checking the measured powers stored in the event buffer and identifying each of the detected onsets to be an impulse event if each of the detected onsets satisfies a predetermined condition, and an impact sound source verifier, if each of the detected onsets is identified to be the impulse event, discriminating impulse events by comparing the impulse events with target impact sound events.

The onset detector may include an AC/DC separator separating an AC component of the input signal, as the high frequency signal, and a DC component of the input signal, as the low frequency signal, a high frequency onset detector obtaining a phase characteristic and an amount of power change of the AC component in a frequency domain, calculating an amount of power change of the AC component in a time domain, detecting onsets of the AC component using the phase characteristic and the amounts of power change of the AC component, and outputting a trigger value, a low frequency onset detector subdividing the DC component into frequency bands, obtaining an amount of power change for each frequency band, detecting onsets of the DC component by comparing the amounts of power change for each frequency band with a first threshold and combining the amounts of power change for each frequency band, and outputting an onset determining value, and an onset determiner determining whether onsets occur in the input signal using respective amounts of power change for the AC component and each frequency band, the trigger value, and the onset determining value.

The impact sound verifier may also include an impulse onset selector determining whether each of the detected onsets is the impulse onset by checking the measured powers stored in the event buffer, an event former, if it is determined that each of the detected onsets is the impulse onset, searching each event duration started from the impulse onsets using the measured powers stored in the event buffer, and an impulse event selector determining each event searched by the event former to be the impulse event if the events satisfy impulse event characteristics.

Further, the event former may output time stamps between a start time and an ending time of the event duration, and the impact sound source verifier may include a feature vector extractor extracting feature vectors from spectral data corresponding to the time stamps among spectral data stored in the event buffer, and a classifier discriminating the input signal by calculating similarities between the extracted feature vectors and feature vectors of the target impact sound events.

Here, the feature vector extractor may include a divider dividing spectral data input from the event buffer within the time stamps into segments, an accumulator accumulating the spectral data for each segment to generate vectors, and a discrete-cosine-transformer outputting feature vectors by performing discrete-cosine-transform on the vectors.

The accumulator may normalize the accumulated results so that a variance of the accumulated results is compensated for. Further, the classifier may further include a template pool storing feature vectors of the target impact sounds.

To achieve the above and/or other aspects and advantages, embodiments of the present invention set forth an impact sound discriminating method including separating an input signal of a frame unit into an AC component of a high frequency and a DC component of a low frequency, measuring powers of the separated high and low frequency signals and detecting onsets by checking changes of the measured powers, buffering the measured powers and the input signal and determining whether each of the detected onsets is an impulse onset, detecting each event starting from impulse onsets by checking the buffered measured powers if a detected onset is the impulse onset, determining detected events to be an impulse event if the detected events satisfy a predetermined condition, and identifying impulse events by comparing the impulse events with target impact sound events if a detected event is determined to be the impulse event.

The detecting of the onset may include obtaining a phase characteristic and an amount of power change of the AC component in a frequency domain, calculating an amount of power change of the AC component in a time domain, detecting onsets of the AC component by combining the phase characteristic and the amounts of power change of the AC component to output a trigger value, subdividing the DC component into frequency bands and obtaining the amounts of power change for each frequency band, detecting onsets of the DC component by comparing the amounts of power change of the DC component for each frequency band with a first threshold and combining the amounts of power change, and detecting onsets of the input signal by combining the detected onsets of the AC and DC components, the trigger value, and the onset determining value.

The determining of each of the detected events to be the impulse event may further include determining whether power peaks occur by monitoring the buffered measured powers and determining whether each of the onsets is the impulse onset by comparing a power value increased from a start time of each of the onsets to a power peak time with a predetermined threshold.

In addition, the detecting of the events may include forming events by defining a start time of each of event durations as the power peak time and an ending time of each of the event durations as a time when power falls below a predetermined level or when a succeeding impulse onset occurs.

Further, the identifying of the impulse events may include obtaining time stamps between a start time and an ending time of each of the event durations, extracting feature vectors from spectral data corresponding to the time stamps among buffered spectral data, and discriminating the input signal by calculating similarities between the extracted feature vectors and feature vectors of the target impact sound events.

The extracting of the feature vectors may include dividing the buffered spectral data within the time stamps into segments, accumulating spectral data for each segment to generate vectors, and obtaining feature vectors by performing discrete-cosine-transform on the generated vectors. Further, the accumulating normalizes the accumulated results so that a variance of the accumulated results is compensated for.

To achieve the above and/or other aspects and advantages, embodiments of the present invention set forth a medium for impact sound detecting including computer readable code implementing embodiments of the present invention, and embodiments of the present invention set forth a medium for impact sound discriminating including computer readable code implementing embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
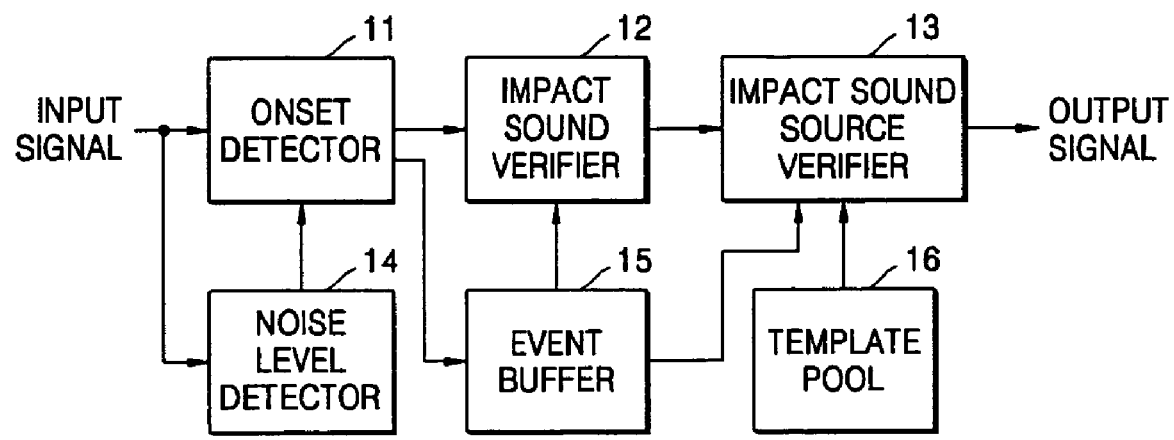
FIG. 1 is a block diagram of an apparatus for detecting and discriminating an impact sound, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of an apparatus for detecting and discriminating an impact sound, according to an embodiment of the present invention. Referring to FIG. 1, an impact sound detecting apparatus may include an onset detector 11, an event buffer 15, and an impact sound verifier 12.

An impact sound discriminating apparatus may include the impact sound detecting apparatus and an impact sound source verifier 13.

The onset detector can further include a noise level detector 14 for onset detection, and the impact sound source verifier 13 can further include a template pool 16.

The onset detector 11 separates an input signal of a frame unit into a low frequency signal and a high frequency signal, measures the powers of the signals, and detects onsets by performing a Fourier analysis and other statistical processes with respect to the signals.

Here, the onset, a suddenly occurring physical event signal, shows a rapid amplitude or power increase. The event, an acoustic event, has a decay pattern as general events have. The event has a duration from an onset to a time when a power falls below a predetermined level or when another impulse onset occurs.

Figure 2:
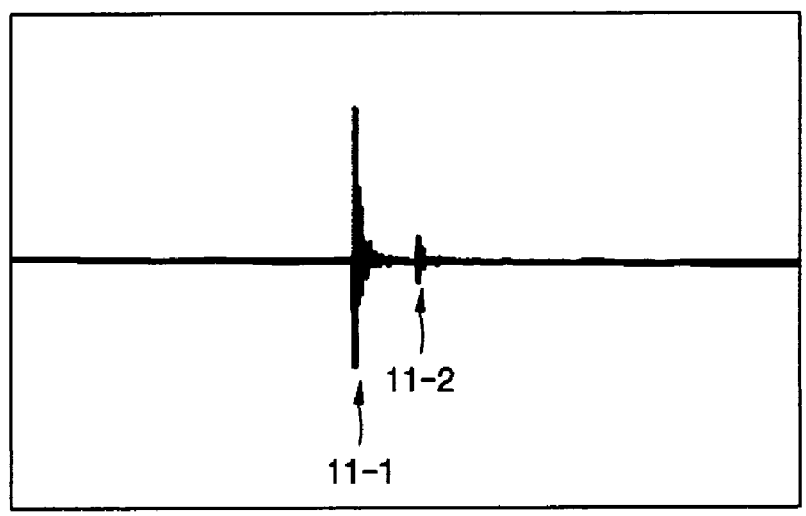
FIG. 2 illustrates a signal having two events.

FIG. 2 illustrates a signal having two events. The illustrated signal was generated when a wood plate was hit by a wood stick, with the duration of the signal being 0.27 seconds. Reference numbers 11-1 and 11-2 indicate onsets of impulse events, with an interval between the onsets being about 23 ms.

The event buffer 15 stores spectral data of the input signal and power data generated when the input signal is processed by the onset detector 11.

The noise level detector 14 detects a long-term noise level from the input signal. The onset detector 11 can detect onsets by subtracting the long-term noise level from the input signal and processing the subtracted signal.

The impact sound verifier 12 verifies and outputs impulse event onsets (hereinafter, impulse onset) from the onset detected by the onset detector 11. The impact sound verifier 12 verifies whether the onsets detected by the onset detector 11 are impulse onsets using the power data stored in the event buffer 15. An impulse onset is verified by confirming whether an absolute value of a power level is larger than a predetermined threshold after the onset and whether there is a power decay pattern as shown in a general impact sound pattern.

The impact sound source verifier 13 extracts and classifies feature vectors of the spectral data stored in the event buffer 15 and verifies whether the input signal includes a target impact sound. The template pool 16 stores a plurality of feature vectors referred to when the feature vectors from the input signal are classified.

Figure 3:
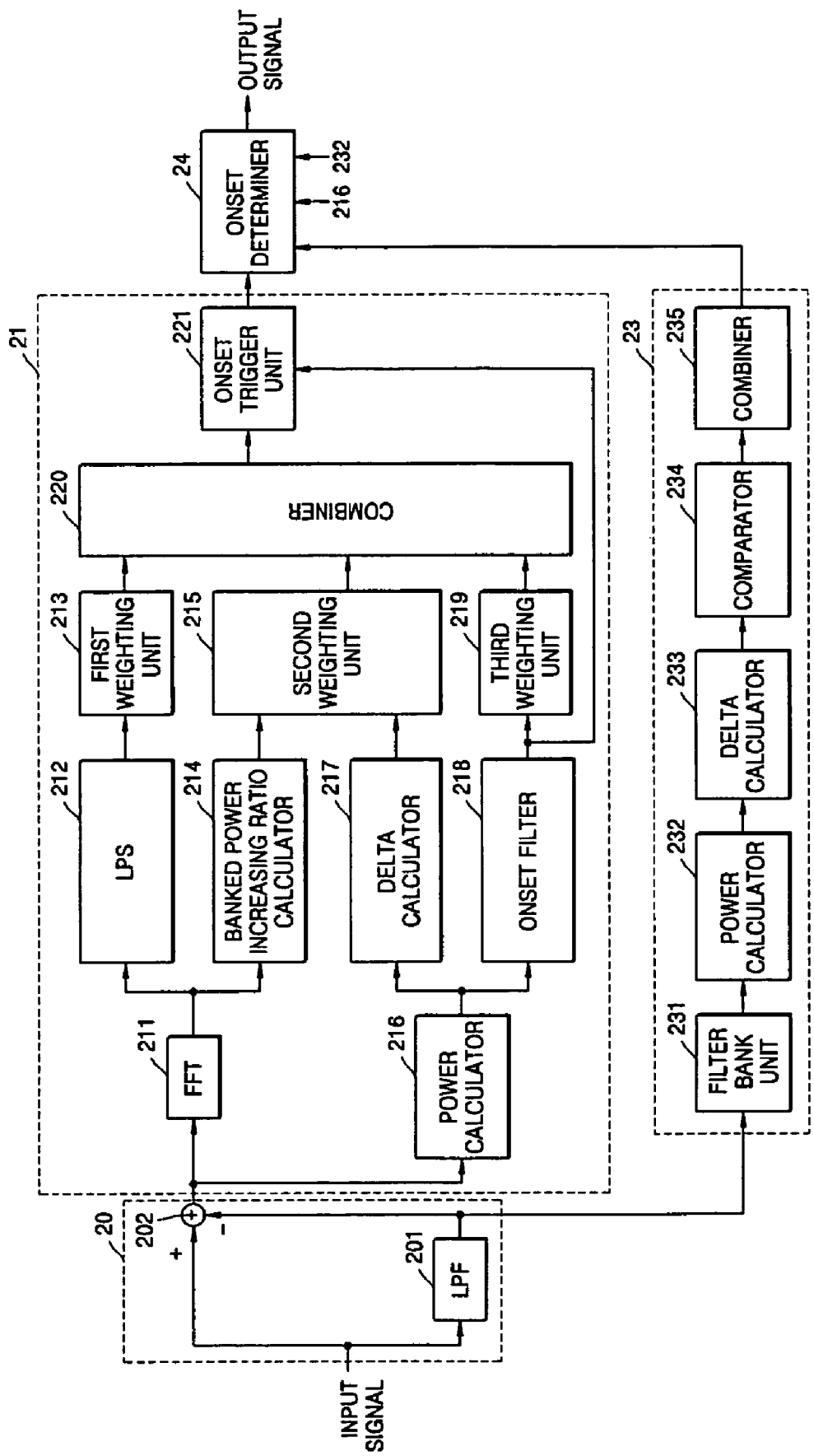
FIG. 3 is a detailed block diagram of an onset detector of FIG. 1, according to an embodiment of the present invention.

FIG. 3 is a detailed block diagram of the onset detector 11 of FIG. 1, according to an embodiment of the present invention. The onset detector 11 detects onsets by processing an input signal in a frame unit using a window of a size of N samples, wherein N is an even number. Referring to FIG. 3, the onset detector 11 includes an AC/DC separator 20, a high frequency onset detector (HOD) 21, a low frequency onset detector (LOD) 23, and an onset determiner 24.

The AC/DC separator 20 includes a low pass filter (LPF) 201 and an adder 202 and separates AC/DC signals from the input signal. The DC signal is obtained by passing the input signal through the LPF 201 and extracting only a low frequency component. The AC signal is obtained by subtracting the low frequency component from the input signal. Here, the input signal is processed in a frame unit.

The HOD 21 includes a fast Fourier transformer (FFT) 211, a linear phase span unit (LPS) 212, a first weighting unit 213, a banked power increasing ratio calculator 214, a second weighting unit 215, a power calculator 216, a delta calculator 217, an onset filter 218, a third weighting unit 219, a combiner 220, and an onset trigger unit 221 and detects onsets of a high frequency component. Here, the FFT 211, the LPS 212, and the banked power increasing ratio calculator 214 are signal processing blocks operated in a frequency domain; and the power calculator 216, the delta calculator 217, and the onset filter 218 are signal processing blocks operated in a time domain.

The FFT 211 fast-Fourier-transforms the AC component of the input signal.

If spectral data of the input signal is $x(0), x(1), \ldots, x(N-1)$, and each half of a frame is Y1 and Y2, Y1 and Y2 are vectors, each having N/2 elements. Y1 and Y2 are represented as shown in Equation 1 below.

$$Y_1 = DFT\left(\left\{x(0), x(1), \ldots, x\left(\frac{N}{2}-1\right)\right\}\right),$$

$$Y_2 = DFT\left(\left\{x\left(\frac{N}{2}\right), x\left(\frac{N}{2}+1\right), \ldots, x(N)\right\}\right)$$

Equation 1

Here, DFT is a function of discrete Fourier transform.

The LPS 212 unwraps phases of the spectral data and extracts linearity of the unwrapped phase spectrum $\phi(n)$. Here, $\phi(n)$, a linear function, can be approximated using Equation 2 below.

$$\hat{\phi}(n) = an + \hat{\phi}(0)$$

Equation 2

Here, a is a constant number.

According to Equation 2, the linearity of $\phi(n)$ can be approximated using square deviation of $\phi(n)$ as shown in Equation 3 below.

$$\text{Phase linearity} = \frac{\sum_n (\varphi(n) - \overline{\varphi})^2}{\sum_n (\varphi(n) - \hat{\varphi}(n))^2} \text{ where,}$$

$$\overline{\varphi} = \frac{1}{N}\sum_n \varphi(n)$$

Equation 3

If Equation 3 is applied to each spectral data, in order to unwrap the phases of the spectral data, the LPS 212 adds 2 $m\pi$ to each phase angle so that the absolute values of differences between all adjacent phase angles are not larger than $\pi$. Here, m is a natural number. A linear component is represented as a linear function whose frequency n is between 0 and N/2 and whose value is 0 when n=0. A slope of the linear function is a value obtained by multiplying 24 by an inner product of $(1, 2, \ldots, N/2)$ and first through (N/2)th unwrapped phase angles and dividing the multiplied result by $N(N+1)(N+2)$.

A linear phase span is calculated from a difference between a first phase linearity value and an (N/2)th phase linearity value.

Figure 4A:
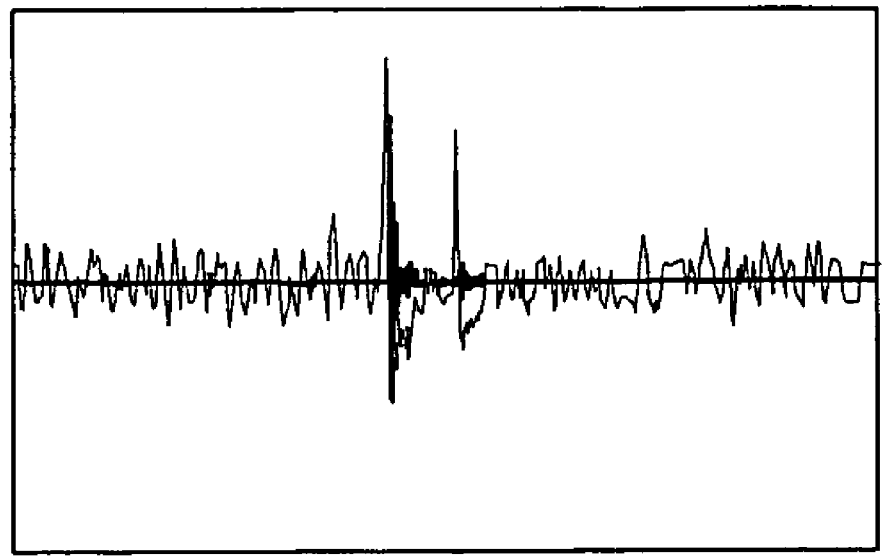
FIG. 4A illustrates an example of a linear component of an unwrapped phase spectrum extracted from the signal of FIG. 2.
Figure 4B:
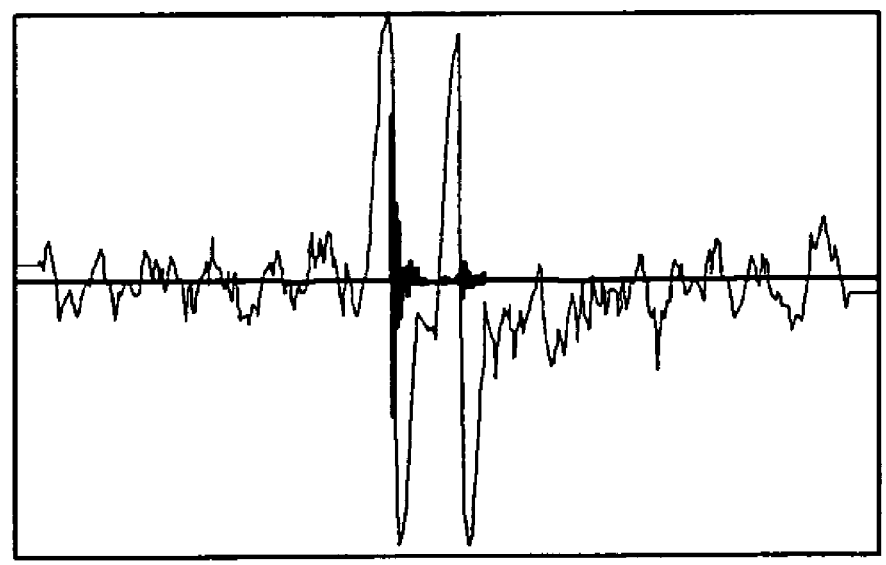
FIG. 4B illustrates a result of spanning the linear component of the phase spectrum of FIG. 4A.

FIG. 4A illustrates an example of a linear component of an unwrapped phase spectrum extracted from the signal of FIG. 2. FIG. 4B illustrates an example of a result of spanning the linear component of the phase spectrum of FIG. 4A.

The first weighting unit 213 checks the latest output values following a linearly increasing pattern of the LPS 212. It is preferable that the first weighting unit 213 is a matched filter. An output of the first weighting unit 213 is calculated from a value obtained by multiplying N/2 by an inner product of a vector including the latest N/2 output values of the LPS 212 and a desired pattern vector. Here, the desired pattern vector has an ideal linear phase span, and an ideal value corresponding to a kth linear phase span is $24(N/2-k)/(N-1\_N(N+1))\pi$.

The banked power increasing ratio calculator 214 obtains powers of upper N/2 and lower N/2 spectral data from a current frame as indicated in Equation 4 below, counts the number of frequencies having a power increase that is greater than a predetermined threshold, and outputs a result of dividing the counted number by N/2.

$$\text{Power increasing ratio} = \frac{2}{N}\sum_{n=0}^{\frac{N}{2}-1} s(\log|Y_2(n)|^2 - \log|Y_1(n)|^2 - th)$$

Equation 4 where, th is a threshold larger than 0 and s(t) indicates a step function where $t \geq 0$.

Figure 5A:
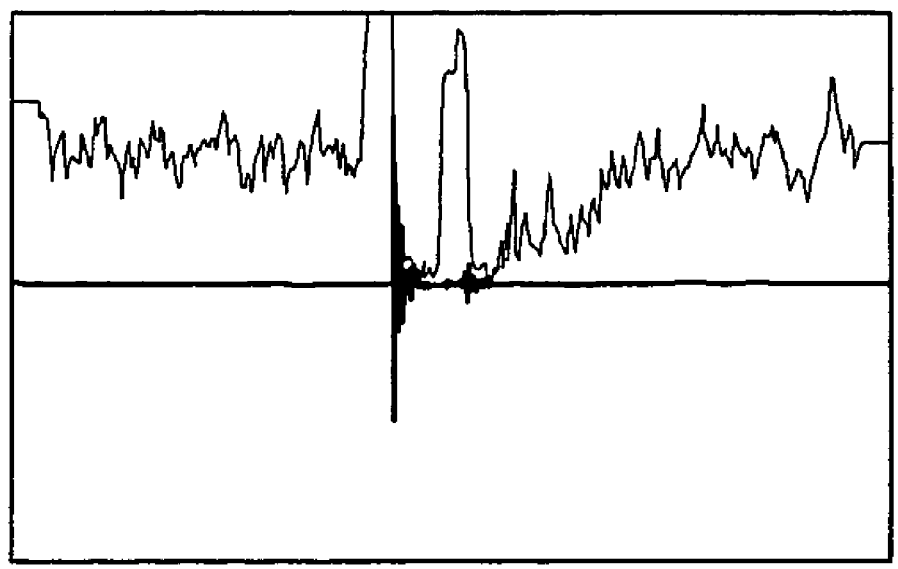
FIG. 5A illustrates an example of a result of calculating a power increasing ratio of the signal of FIG. 2.

According to a calculating result of Equation 4, a high level (nearly 1) is obtained near an onset time, and the duration of the high level zone depends on a length of a window. FIG. 5A illustrates an example of a result of calculating a power increasing ratio of the signal of FIG. 2. Referring to FIG. 5A, the high level is maintained near the onset for a predetermined time period.

The power calculator 216 calculates power of an AC component of a frame and scales the power with a log operator. The delta calculator 217 obtains a difference between a current input log-power and an immediately previous input log-power. The power and delta-log-power are calculated using Equation 5 below.

$$\text{Power} = \frac{1}{N}\sum_{n=0}^{N-1} x(n)^2$$

$$\text{Delta-log-power} = \log\left(\sum_{n=\frac{N}{2}}^{N-1} x(n)^2 \Big/ \sum_{n=0}^{\frac{N}{2}-1} x(n)^2\right)$$

Equation 5

Figure 5B:
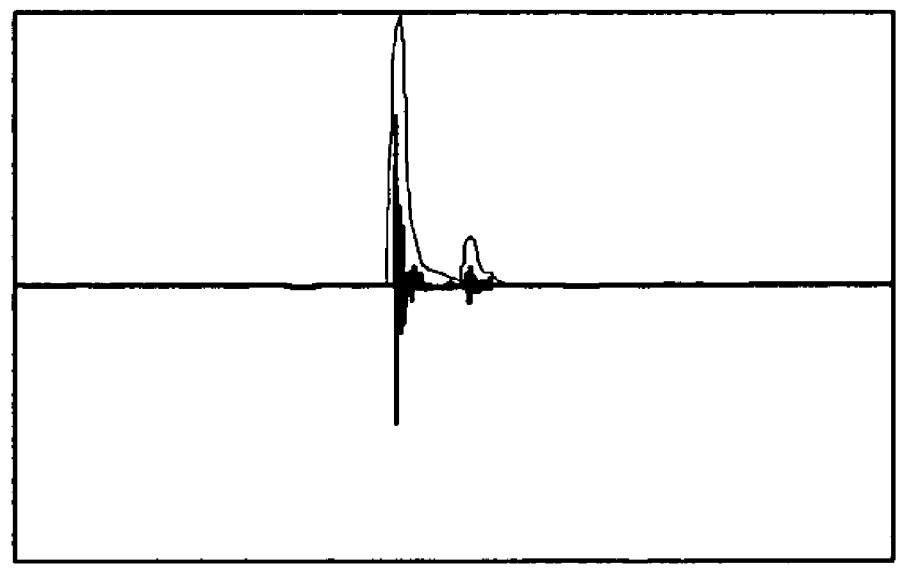
FIG. 5B illustrates an example of a result of calculating powers of the signal of FIG. 2.
Figure 5C:
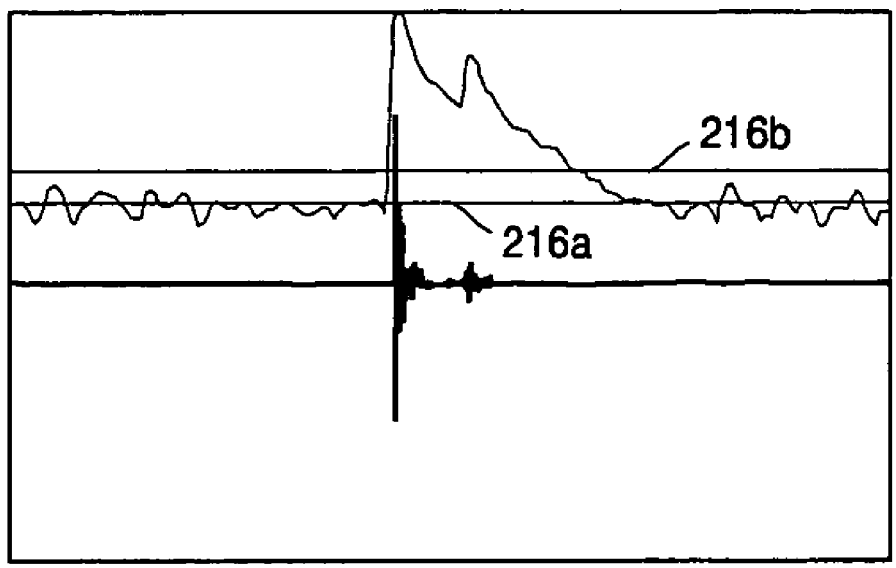
FIG. 5C illustrates an example of a result of scaling the powers of FIG. 5B logarithmically.
Figure 5D:
FIG. 5D illustrates an example of a output signal of a delta calculator of FIG. 3.

FIG. 5B illustrates an example of a result of calculating powers of the signal of FIG. 2. Referring to FIG. 5B, the powers dramatically increase at the onsets. FIG. 5C illustrates a result of scaling the powers of FIG. 5B logarithmically. Referring to FIG. 5C, a reference number 216a indicates a noise level, and a reference number 216b indicates a threshold larger than the noise level by around 10.8 dB. FIG. 5D illustrates an example of an output signal of the delta calculator 217 of FIG. 3. Referring to FIG. 5D, a location where the onset occurred can be obtained more exactly.

The second weighting unit 215 shift-multiplies an output of the banked power increasing ratio calculator 214 and an output of the delta calculator 217. The shift-multiply operation will now be described in detail. If X and Y indicate two vectors, s indicates a shift operation, and Z indicates a result of shift-multiplying X and Y, a kth element of Z is obtained from a maximum value among values obtained by multiplying respective elements of X and Y, each having k−s through k+s indexes. If s=0, the shift-multiplied result is the same as a result of a scalar multiplication of the two vectors.

The onset filter 218 calculates an average in a current frame and a previous frame, respectively, of the log-powers output from the power calculator 216 and outputs a value obtained by subtracting the previous average from the current average. The two averages are calculated using a second filter formed by combining two first order linear filters, and an impulse response to the combined filter is calculated using Equation 6 below.

$$h(n)=(1-e^{1/\tau_e})e^{n/\tau_e}-(1-e^{1/\tau_i})e^{n/\tau_i}, n=1, 2, 3, \ldots \qquad \text{Equation 6}$$

Here, $\tau_e$ and $\tau_i$ indicate time constants of two first order linear filters, and $\tau_e \leq \tau_i$.

Figure 6:
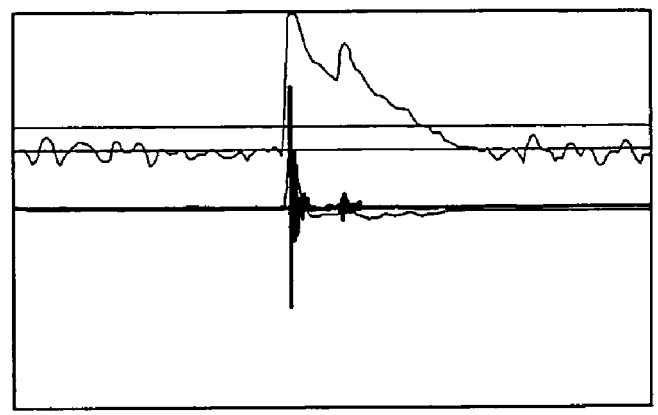
FIG. 6 illustrates an example of a result of applying an onset filter to log-powers of FIG. 5B.

FIG. 6 illustrates an example of a result of applying an onset filter to log-powers of FIG. 5B.

The third weighting unit 219 may be an identity operator.

The combiner 220 adds outputs of the first, second, and third weighting units 213, 215, and 219. If a result of the addition is positive, it indicates that all outputs of the first, second, and third weighting units 213, 215, and 219 exceed a predetermined threshold.

The onset trigger unit 221 outputs a positive or negative trigger value according to an output of the combiner 220 by using the output of the onset filter 218 as a control signal. If the control signal is smaller than an active level, the onset trigger unit 221 outputs the negative value regardless of the output of the combiner 220, and if the control signal is equal to or larger than the active level, the onset trigger unit 221 outputs the positive value when the output of the combiner 220 is positive and the negative value when the output of the combiner 220 is negative.

The LOD 23 includes a filter bank unit 231, a power calculator 232, a delta calculator 233, a comparator 234, and a combiner 235.

The filter bank unit 231 includes a plurality of band pass filters (not shown) and subdivides the low frequency audio signal output from the LPF 201 into frequency bands. The power calculator 232 accumulates powers of the low frequency audio signals corresponding to each band. The delta calculator 233 subtracts the power of an (i−1)th band from the power of an ith band and outputs a delta log-power by taking a logarithm of the result of subtraction. The comparator 234 detects a local onset in each band by determining whether the delta log-power is larger than a predetermined threshold. The combiner 235 combines onsets detected in each band and outputs an onset determining value of the entire low frequency band.

The onset determiner 24 adds outputs of the HOD 21 and the LOD 23 and outputs a binary signal indicating whether or not an onset occurs. If the output signal of the LOD 23 is positive and the power of the entire low frequency band calculated by the power calculator 232 is larger than or equal to 20% of the total audio signal power, or if the output signal of the HOD 21 is positive and a power of the entire high frequency band calculated by the power calculator 216 is larger than or equal to 5% of the total audio signal power, it is determined that an onset occurred. Otherwise, it is determined that an onset did not occur.

Figure 7:
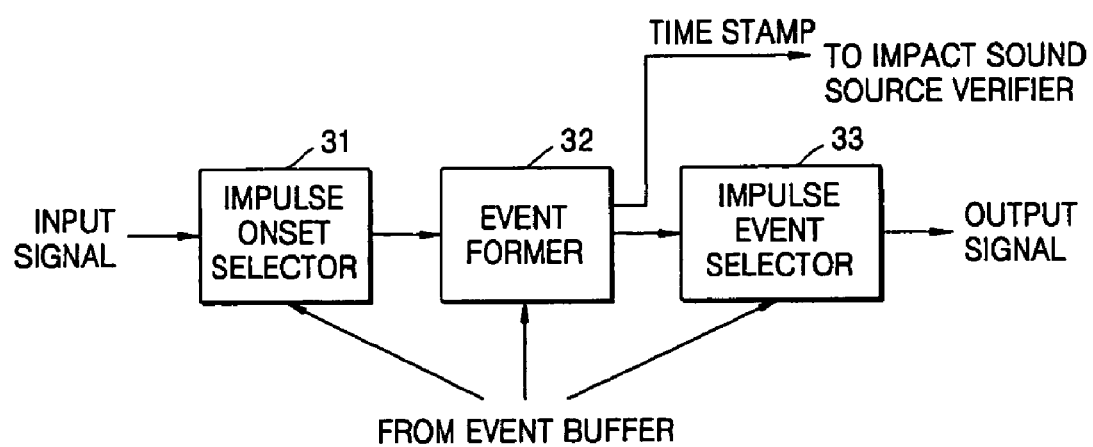
FIG. 7 is a detailed block diagram of an impact sound verifier of FIG. 1, according to an embodiment of the present invention.

FIG. 7 is a block diagram of the impact sound verifier 12 of FIG. 1. Referring to FIG. 7, the impact sound verifier 12 includes an impulse onset selector 31, an event former 32, and an impulse event selector 33.

If an onset is detected by the onset detector 11, the impulse onset selector 31 monitors log-powers buffered in the event buffer 15 and outputs a result of whether a power peak of the onset occurs. The power peak occurs when a logarithmically scaled power reaches a maximum value in an onset duration. The onset duration is a period during which the onset trigger unit 221 of FIG. 2 is in an active state. The impulse onset selector 31 also searches a zone where power dramatically increases between an onset start time and a peak time. In the zone, there are consecutive data showing power increase greater than a first threshold during a shorter duration than a second threshold. If the search succeeds, the impulse onset selector 31 outputs a positive value. Otherwise, it outputs a negative value.

The event former 32 is triggered when the impulse onset selector 31 outputs the positive value and determines an event duration while monitoring log-powers, which are output from the event buffer 15, from when the power peak occurs. The event duration is from an event start time to an event ending time. The event start time is defined as the time when the power peak occurs, and the event ending time is when the log-power falls below a background noise level or when the event former 32 is triggered again by the impulse onset selector 31. The event former 32 outputs time stamps at the event start time and the event ending time to the impact sound source verifier 13.

If the event ending time is indicated by one of the above two cases, the impulse event selector 33 determines whether the peak level of the event signal attenuates in an appropriate attenuating method during the event duration. That is, the impulse event selector 33 determines whether an entire event attenuated from the onset is an impulse event. Here, the appropriate attenuating method is referred to have the peak level attenuated exponentially, and the determining is achieved by selecting a power function indicating a log-power signal pattern and examining whether a parameter indicating a degree of attenuation is within an appropriate range.

Figure 8:
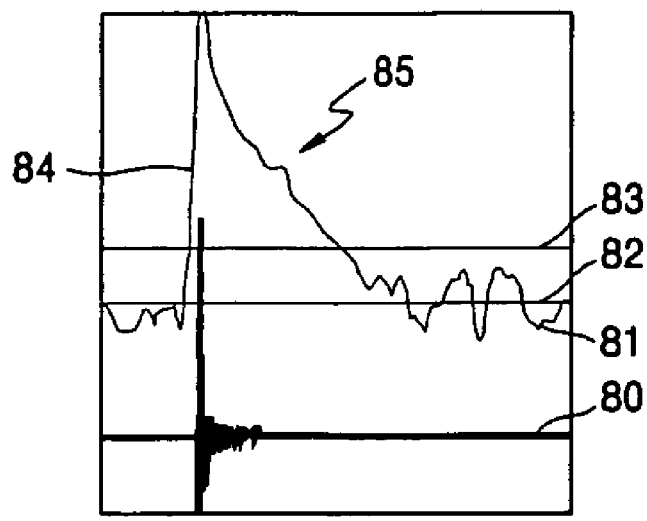
FIG. 8 illustrates a typical impulse event signal.

FIG. 8 illustrates a typical impulse event signal. The impulse signal in FIG. 8 includes an input signal 80, a log-power signal 81, a noise level 82, a level of 10.8 dB higher than the noise level 83, and an onset 84. Referring to FIG. 8, the onset 84 dramatically increases. Reference number 85 indicates an almost linearly attenuating log-power level showing a characteristic of the impulse event. The slope of the log-power shown in FIG. 8 can be represented with an exponential function exp(●)$^{-\lambda}$, wherein λ approximates the slope of the log-power.

The impulse event selector 33 searches λ approximating to the log-power signal and determines whether λ is within a desired range.

Figure 9A:
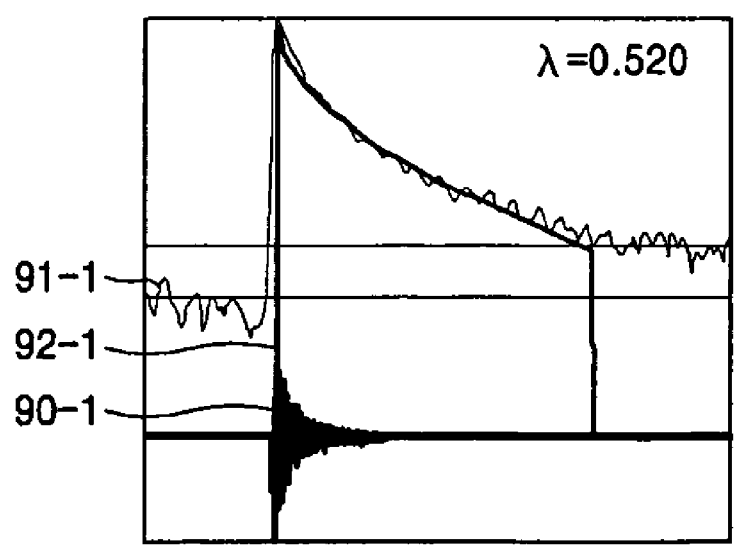
FIGS. 9A through 9D illustrate log-power signals for input signals and approximated signals for the log-power signals.
Figure 9B:
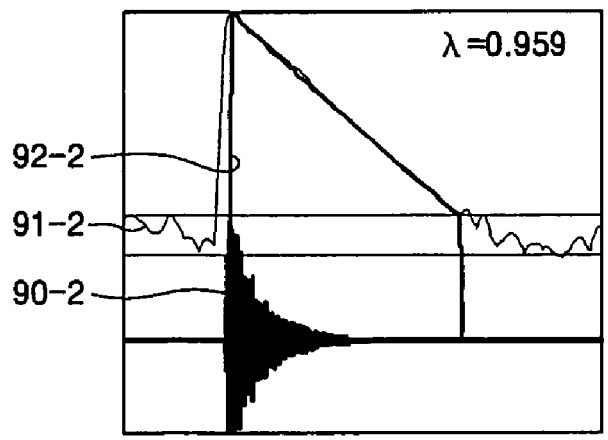
Figure 9C:
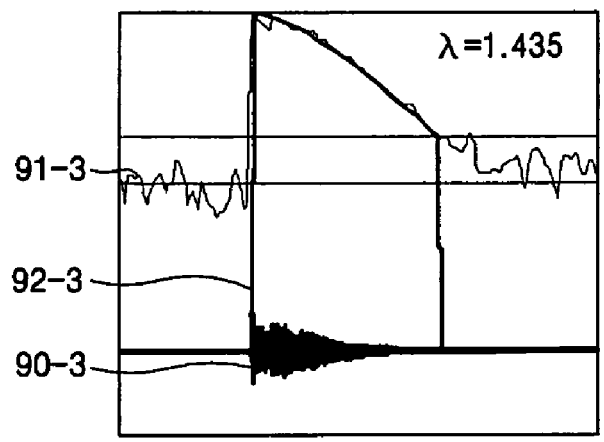
Figure 9D:
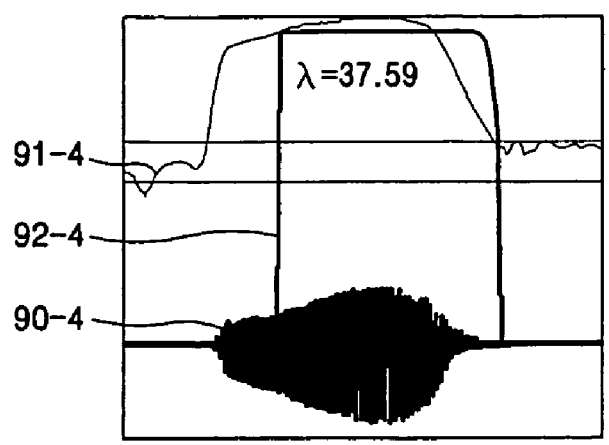

FIGS. 9A through 9D illustrate log-power signals corresponding to input signals and approximated signals corresponding to the log-power signals. Referring to FIGS. 9A through 9D, reference numbers 90-1, 90-2, 90-3, and 90-4 indicate input signals, and reference numbers 91-1, 91-2, 91-3, and 91-4 indicate log-powers of the input signals, respectively. Reference numbers 92-1, 92-2, 92-3, and 92-4 indicate approximated log-power signals. When each log-power signal is between a noise level set for each signal and a threshold higher than the noise level, the log-power signals are approximated to 0, and when each log-power signal attenuates from each onset to a threshold, the log-power signals are approximated to signals where λ is 0.520, 0.959, 1.435, and 37.59, respectively. FIG. 9B shows an ideal impulse event signal, wherein λ is nearly 1. FIGS. 9A and 9C show impulse event signals. FIG. 9D also shows a dramatically increasing power level. However, since λ>>1, the signal cannot be admitted as an impulse event. Actually, FIG. 9D shows a phonetic signal not an impact sound.

If the impulse event selector 33 determines the input signal to be an impulse event signal, it triggers the impact sound source verifier 13.

Figure 10:
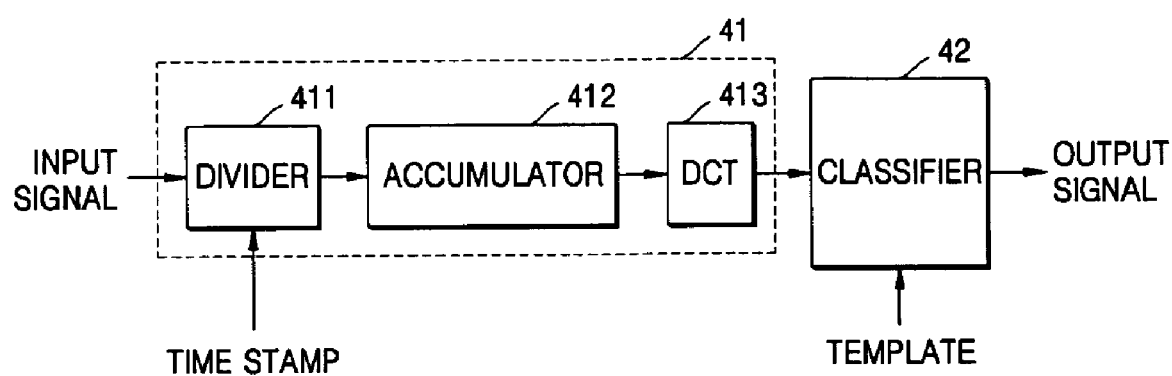
FIG. 10 is a detailed block diagram of an impact sound source verifier of FIG. 1, according to an embodiment of the present invention.

FIG. 10 is a detailed block diagram of the impact sound source verifier 13 of FIG. 1. Referring to FIG. 10, the impact sound source verifier 13 includes a feature vector extractor 41 and a classifier 42.

The feature vector extractor 41 includes a divider 411, an accumulator 412, and a discrete cosine transformer (DCT) 413 and extracts appropriate feature vectors from spectral data of an event.

The divider 411 divides spectral data input from the event buffer 15 into M segments within an interval specified by the time stamps input from the event former 32. The accumulator 412 accumulates the spectral data per each segment and generates M vectors, each having N/2 elements. Here, the accumulated result can be normalized to compensate for a variance of the accumulated result.

The DCT 413 outputs feature vectors by performing a discrete-cosine-transform on the M vectors. Other features can be added to the feature vectors output from the DCT 413. An example of the feature can be an attenuating slope obtained from an event duration or an approximated power function of an event.

The classifier 42 determines whether a desired impact sound is detected by comparing the feature vectors output from the DCT 413 and templates output from the template pool 16. Here, the template pool 16 stores statistical models of target events and a threshold for detection. The classifier 42 outputs a result of whether the input signal is a target impact sound by calculating similarities between the feature vectors and the templates and determining whether the calculated similarities are larger than the threshold for detection. A statistical classifier, such as a Gaussian mixture model, an N-nearest neighbor method, and a neural network, can be used as the classifier 42.

The present invention may be embodied in a general-purpose computer by implementing computer readable code from a medium, e.g., a computer-readable medium, including but not limited to storage media such as magnetic storage media (ROMs, RAMs, floppy disks, magnetic tapes, etc.), optically readable media (CD-ROMs, DVDs, etc.), and carrier waves (e.g., transmission over the internet). The present invention may also be embodied as a medium having a computer-readable code embodied therein for causing a number of computer systems connected via a network to effect distributed processing. And the functional programs, codes and code segments for embodying the present invention may be easily deducted by programmers in the art which the present invention belongs to.

As described above, according to the present invention, a desired impact sound among impact sounds generated from the surroundings, for example, an impact sound of an object, a sound when a pane of glass is broken, a gunshot, or a footstep, can be discriminated. Therefore, the present invention can be applied to a security system and to diagnose a defect of a structure on the basis of an acoustic diagnosis.

While embodiments of the present invention have been described based on the assumption that input video data was variable length coded with reference to embodiments thereof, it will be understood by those skilled in the art that fixed length coding of the input video data may be embodied from the spirit and scope of the invention. Embodiments should be considered in descriptive sense only and not for purposes of limitation.

Thus, although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An impact sound detecting apparatus, comprising:
   an onset detector separating an input signal of a frame unit into a low frequency signal and a high frequency signal, measuring powers of the separated low frequency and high frequency signals, and detecting an onset by detecting changes in the measured powers;
   an event buffer buffering the measured powers and corresponding spectral data of the input signal; and
   an impact sound verifier determining whether each detected onset is an impulse onset, and if each detected onset is the impulse onset then detecting events starting from the corresponding impulse onsets by checking the corresponding measured powers stored in the event buffer and identifying each of the detected events to be an impulse event if each of the detected onsets satisfies a predetermined condition.

2. The apparatus of claim 1, wherein the onset detector comprises:
   an AC/DC separator separating an AC component from the input signal, as the high frequency signal, and a DC component from the input signal, as the low frequency signal;
   a high frequency onset detector obtaining a phase characteristic and an amount of power change of the AC component in a frequency domain, calculating amounts of power change of the AC component in a time domain, detecting onsets of the AC component using the phase characteristic and the amounts of power change of the AC component, and outputting a trigger value;
   a low frequency onset detector subdividing the DC component into frequency bands, obtaining amounts of power change for each frequency band, detecting onsets of the DC component by comparing the amounts of power change of each frequency band with a first threshold and combining the amounts of power change of each frequency band, and outputting an onset determining value; and
   an onset determiner identifying whether onsets occur in the input signal using respective amounts of power change for the AC component and each frequency band, the trigger value, and the onset determining value.

3. The apparatus of claim 2, wherein the AC/DC separator comprises:
   a low pass filter passing the low frequency signal of the input signal; and
   a subtractor outputting the high frequency signal by subtracting the low frequency signal from the input signal.

4. The apparatus of claim 2, wherein the high frequency onset detector comprises:
a frequency domain onset detector obtaining a phase linearity in the frequency domain and a power change ratio by performing fast-Fourier transform on the AC component;
a time domain onset detector obtaining powers of the AC component in the time domain and obtaining the amounts of power change of the AC component by respective spectral data of the input signal;
a combiner combining an output of the frequency domain onset detector and an output of the time domain onset detector; and
an onset trigger unit identifying an output of the combiner to be the onsets of the AC component according to the amounts of power change of the AC component from the time domain onset detector and outputting the corresponding trigger value.

5. The apparatus of claim 4, wherein the frequency domain onset detector comprises:
a fast Fourier transformer (FFT) performing the fast-Fourier transform on the AC component;
a linear phase span unit approximating phases of corresponding fast-Fourier-transformed spectral data to a linear function and obtaining a difference between a phase of the approximated first spectral data and a phase of spectral data located at a center of the frame unit; and
a banked power increasing ratio calculator obtaining powers of the fast-Fourier-transformed spectral data, comparing powers of a first half of the frame unit with a second half of the frame unit, and obtaining a ratio of the compared powers greater than a second threshold.

6. The apparatus of claim 5, wherein the time domain onset detector comprises:
a power calculator obtaining a power of the AC component and scaling the obtained power logarithmically;
a delta calculator calculating a difference between log-powers of current spectral data and previous spectral data output from the power calculator; and
an onset filter obtaining an average of log-powers in a current frame unit and outputting a difference between the log-power average of the current frame and a log-power average of a previous frame.

7. The apparatus of claim 6, wherein the onset filter is a second order filter formed by combining two first order filters and has an impulse response as follows:

$$h(n)=(1-e^{1/\tau_e})e^{n/\tau_e}-(1-e^{1/\tau_i})e^{n/\tau_i},\ n=1,2,3,\ldots$$

where $\tau_e$ and $\tau_i$ are time constants of the two first order filters.

8. The apparatus of claim 6, wherein the combiner further comprises:
a first weighting unit matched-filtering an output of the linear phase span unit;
a second weighting unit shift-multiplying outputs of the banked power increasing ratio calculator and the delta calculator; and
a third weighting unit performing an identity operation of an output of the onset filter, wherein
the combiner adds outputs of the first, second, and third weighting units and outputs a result of the addition.

9. The apparatus of claim 6, wherein the onset trigger unit outputs a positive or negative value based on an output of the combiner, using an output of the onset filter as a control signal.

10. The apparatus of claim 2, wherein the low frequency onset detector comprises:
a filter bank unit subdividing the DC component into frequency bands;
a power calculator calculating a power for each frequency band and scaling the calculated powers logarithmically;
a delta calculator calculating differences of log-powers output from the power calculator between neighboring frequency bands;
a comparator determining whether a local onset occurs by comparing each delta log-power output from the delta calculator for each frequency band with the first threshold; and
a combiner combining the detected local onsets, detected by the comparator, to output the onset determining value.

11. The apparatus of claim 2, wherein the onset determiner outputs a binary signal indicating whether an onset occurs by adding the trigger value and the onset determining value if the trigger value is output and a ratio of powers measured by the high frequency onset detector to a total power of the input signal is greater than the second threshold.

12. The apparatus of claim 2, wherein the onset determiner outputs a binary signal indicating whether an onset occurs by adding the trigger value and the onset determining value if the onset determining value is output and a ratio of powers measured by the low frequency onset detector to a total power of the input signal is greater than the second threshold.

13. The apparatus of claim 1, the onset detector further comprising a noise level detector detecting a noise level of the input signal,
wherein the onset detector detects onsets from a signal obtained by subtracting the detected noise level from the input signal.

14. The apparatus of claim 1, wherein the impact sound verifier comprises:
an impulse onset selector determining whether each of the detected onsets is an impulse onset by checking the corresponding measured powers stored in the event buffer if the detected onsets are detected by the onset detector;
an event former searching each event duration started from the impulse onsets using the measured powers stored in the event buffer; and
an impulse event selector identifying each event searched by the event former to be an impulse event if corresponding events satisfy characteristics for the impulse event.

15. The apparatus of claim 14, wherein the impulse onset selector, if the onsets are detected, determines whether power peaks occur by monitoring the measured powers stored in the event buffer and determines whether the detected onsets are impulse onsets by comparing amounts of power increases from a start time of each of the detected onsets to each of power peak times with a predetermined threshold.

16. The apparatus of claim 15, wherein the event former forms each of the events by defining a start time of an event duration as an occurrence time of each of the power peaks and an ending time of the event duration as a time when power falls below a predetermined level or when the impulse onset selector outputs a succeeding impulse onset.

17. The apparatus of claim 15, wherein the impulse event selector searches a power function approximating the events formed by the event former and determines whether each of the events is an impulse event by determining whether the power function attenuates exponentially within a predetermined range from each of the power peaks.

18. The apparatus of claim 16, wherein the impulse event selector searches a power function approximating the events formed by the event former and determines whether each of the events is an impulse event by determining whether the power function attenuates exponentially within a predetermined range from each of the power peaks.

19. An impact sound detecting method comprising:
separating an input signal of a frame unit into an AC component, from the input signal, a high frequency signal and a DC component, from the input signal, as a low frequency signal;
measuring powers of the separated high and low frequency signals and detecting onsets by checking changes of the measured powers;
buffering the measured powers and the input signal and determining whether each of the detected onsets is an impulse onset;
detecting events starting from onsets determined to be impulse onsets by checking the buffered powers for each of the detected onsets determined to be impulse onsets; and
identifying each of the detected events to be an impulse event if the detected events satisfy a predetermined condition.

20. The method of claim 19, wherein the detecting of the onset comprises:
obtaining a phase characteristic and an amount of power change of the AC component in a frequency domain;
calculating an amount of power change of the AC component in a time domain; detecting onsets of the AC component by combining the phase characteristic and the amounts of power change for the AC component in the frequency and time domains, to output a trigger value;
subdividing the DC component into frequency bands and obtaining amounts of power change for each frequency band;
detecting onsets of the DC component by comparing the amounts of power change of the DC component for each frequency band with a first threshold and combining the amounts of power change for each frequency band; and
detecting the onsets of the input signal based on a combining the detected onsets of the AC and DC components, the trigger value and the onset determining value.

21. The method of claim 20, wherein the phase characteristic is obtained by:
performing fast-Fourier transform on the AC component;
approximating phases of the fast-Fourier-transformed AC component spectral data to a linear function; and
obtaining a difference between a phase of an approximated first spectral data and a phase of spectral data located at a center of the frame unit.

22. The method of claim 20, wherein the amount of power change of the AC component in a frequency domain is obtained by:
performing fast-Fourier transform on the AC component; and
obtaining a ratio of power increase greater than a second threshold by comparing powers of a first half of the frame unit of the fast-Fourier-transformed AC component spectral data with a second half of the frame unit.

23. The method of claim 20, wherein the amounts of power change of the AC component in a time domain is obtained by:
obtaining a power of the AC component and scaling the obtained power logarithmically;
calculating a difference between log-powers of current spectral data and previous spectral data; and
obtaining an average of the log-powers in a current frame unit and outputting a difference between log-power averages of the current frame unit and a previous frame unit.

24. The method of claim 20, wherein the combining of the phase characteristic and the amounts of power change comprises:
matched-filtering the phase characteristic;
shift-multiplying the amounts of power change in the frequency domain and the time domain; and
performing identity operation on a difference between log-power averages of a current frame unit and a previous frame unit,
wherein the matched-filtering result, the shift-multiplying result, and the identity operation result are added.

25. The method of claim 20, wherein the detecting of the onsets of the input signal comprises outputting a binary signal, indicating whether an onset occurs, obtained by adding the trigger value and the onset determining value if the trigger value is output and a ratio of a measured power the AC component to a total power of the input signal is greater than a second threshold.

26. The method of claim 20, wherein the detecting of the onsets of the input signal comprises outputting a binary signal, indicating whether an onset occurs, obtained by adding the trigger value and the onset determining value if the onset determining value is output and a ratio of a measured power the DC component to a total power of the input signal is greater than a second threshold.

27. The method of claim 19, wherein the identifying of each of the detected events to be the impulse event comprises determining whether power peaks occur by monitoring the buffered powers and determining whether each of the onsets is the impulse onset by comparing a power value increased from a start time of each of the onsets to a power peak time with a predetermined threshold.

28. The method of claim 27, wherein the detecting of events comprises forming events by defining a start time of each event duration as the power peak time and an ending time of each event duration as a time when power falls below a predetermined level or when a succeeding impulse onset occurs.

29. The method of claim 28, wherein the identifying of the detected events to be the impulse event comprises searching a power function approximating events formed in the detecting of events and determining whether each of the detected events is the impulse event by determining whether the power function attenuates exponentially within a predetermined range from each power peak.

30. An impact sound discriminating apparatus comprising:
an onset detector separating an input signal of a frame unit into a low frequency signal and a high frequency signal, measuring powers of the separated low and high frequency signals, and detecting onsets by checking changes of the measured powers;
an event buffer buffering the measured powers and the input signal;
an impact sound verifier determining whether each of the detected onsets is an impulse onset, and if a detected onset is the impulse onset, detecting events starting from impulse onsets by checking the measured powers stored in the event buffer and identifying each of the detected onsets to be an impulse event if each of the detected onsets satisfies a predetermined condition; and the impact sound source verifier, if each of the detected onsets is identified to be the impulse event, discriminating impulse events by comparing the impulse events with target impact sound events.

31. The apparatus of claim 30, wherein the onset detector comprises:

an AC/DC separator separating an AC component of the input signal, as the high frequency signal, and a DC component of the input signal, as the low frequency signal;

a high frequency onset detector obtaining a phase characteristic and an amount of power change of the AC component in a frequency domain, calculating an amount of power change of the AC component in a time domain, detecting onsets of the AC component using the phase characteristic and the amounts of power change of the AC component, and outputting a trigger value;

a low frequency onset detector subdividing the DC component into frequency bands, obtaining an amount of power change for each frequency band, detecting onsets of the DC component by comparing the amounts of power change for each frequency band with a first threshold and combining the amounts of power change for each frequency band, and outputting an onset determining value; and an onset determiner determining whether onsets occur in the input signal using respective amounts of power change for the AC component and each frequency band, the trigger value, and the onset determining value.

32. The apparatus of claim 30, wherein the impact sound verifier comprises:

an impulse onset selector determining whether each of the detected onsets is the impulse onset by checking the measured powers stored in the event buffer;

an event former, if it is determined that each of the detected onsets is the impulse onset, searching each event duration started from the impulse onsets using the measured powers stored in the event buffer; and an impulse event selector determining each event searched by the event former to be the impulse event if the events satisfy impulse event characteristics.

33. The apparatus of claim 32, wherein the event former outputs time stamps between a start time and an ending time of the event duration, and the impact sound source verifier comprises:

a feature vector extractor extracting feature vectors from spectral data corresponding to the time stamps among spectral data stored in the event buffer; and a classifier discriminating the input signal by calculating similarities between the extracted feature vectors and feature vectors of the target impact sound events.

34. The apparatus of claim 33, wherein the feature vector extractor comprises:

a divider dividing spectral data input from the event buffer within the time stamps into segments;

an accumulator accumulating the spectral data for each segment to generate vectors; and a discrete-cosine-transformer outputting feature vectors by performing discrete-cosine-transform on the vectors.

35. The apparatus of claim 34, wherein the accumulator normalizes the accumulated results so that a variance of the accumulated results is compensated for.

36. The apparatus of claim 33, wherein the classifier further comprises:

a template pool storing feature vectors of the target impact sounds.

37. An impact sound discriminating method comprising:

separating an input signal of a frame unit into an AC component of a high frequency and a DC component of a low frequency;

measuring powers of the separated high and low frequency signals and detecting onsets by checking changes of the measured powers;

buffering the measured powers and the input signal and determining whether each of the detected onsets is an impulse onset;

detecting each event starting from impulse onsets by checking the buffered measured powers if a detected onset is the impulse onset;

determining detected events to be an impulse event if the detected events satisfy a predetermined condition; and identifying impulse events by comparing the impulse events with target impact sound events if a detected event is determined to be the impulse event.

38. The method of claim 37, wherein the detecting of the onset comprises:

obtaining a phase characteristic and an amount of power change of the AC component in a frequency domain;

calculating an amount of power change of the AC component in a time domain;

detecting onsets of the AC component by combining the phase characteristic and the amounts of power change of the AC component to output a trigger value;

subdividing the DC component into frequency bands and obtaining the amounts of power change for each frequency band;

detecting onsets of the DC component by comparing the amounts of power change of the DC component for each frequency band with a first threshold and combining the amounts of power change; and detecting onsets of the input signal by combining the detected onsets of the AC and DC components, the trigger value, and the onset determining value.

39. The method of claim 37, wherein the determining of each of the detected events to be the impulse event comprises determining whether power peaks occur by monitoring the buffered measured powers and determining whether each of the onsets is the impulse onset by comparing a power value increased from a start time of each of the onsets to a power peak time with a predetermined threshold.

40. The method of claim 39, wherein the detecting of the events comprises forming events by defining a start time of each of event durations as the power peak time and an ending time of each of the event durations as a time when power falls below a predetermined level or when a succeeding impulse onset occurs.

41. The method of claim 40, wherein the identifying of the impulse events comprises:

obtaining time stamps between a start time and an ending time of each of the event durations;

extracting feature vectors from spectral data corresponding to the time stamps among buffered spectral data; and discriminating the input signal by calculating similarities between the extracted feature vectors and feature vectors of the target impact sound events.

42. The method of claim 41, wherein the extracting of the feature vectors comprises:
dividing the buffered spectral data within the time stamps into segments;
accumulating spectral data for each segment to generate vectors; and
obtaining feature vectors by performing discrete-cosine-transform on the generated vectors.

43. The method of claim 42, wherein the accumulating normalizes the accumulated results so that a variance of the accumulated results is compensated for.

44. A medium for impact sound detecting comprising computer readable code implementing the method of claim 19.

45. A medium for impact sound discriminating comprising computer readable code implementing the method of claim 37.

* * * * *